United States Patent

Bouricius et al.

[15] 3,665,173

[45] May 23, 1972

[54] TRIPLE MODULAR REDUNDANCY/SPARING

[72] Inventors: Willard G. Bouricius, Katonah, N.Y.; William C. Carter, Ridgefield, Conn.; John P. Roth, Ossining; Peter R. Schneider, Peekskill, both of N.Y.

[73] Assignee: International Business Machines Corporation, Armonk, N.Y.

[22] Filed: Sept. 3, 1968

[21] Appl. No.: 756,753

[52] U.S. Cl...............................235/153, 307/204, 307/211, 328/224

[51] Int. Cl.........................................................G06f 11/04

[58] Field of Search..................235/153; 307/204, 211, 219; 328/244

[56] References Cited

UNITED STATES PATENTS 3,348,197 10/1967 Akers et al..........................235/153 X

*Primary Examiner*—Benjamin A. Borchelt
*Assistant Examiner*—N. Moskowitz
*Attorney*—Lawrence E. Laubscher

[57] ABSTRACT

A computer system of the standby redundancy type including three active logic modules and at least one spare module, characterized by the provision of triple modular redundancy means for correcting and locating the failure of a first one of said active logic modules, in combination with sparing means for reconfiguring the system to by-pass the faulty module and to substitute the spare module therefor. The invention is further characterized by the provision of means for reintroducing the first module into the system upon the detection of failure of another active module.

11 Claims, 16 Drawing Figures

INVENTORS
Willard G. Bouricius
William C. Carter
John P. Roth
Peter R. Schneider BY Lawrence E. Laubscher
ATTORNEYS Patented May 23, 1972 3,665,173

1:, Sheets-Sheet 8

| STATE REGISTER | | | BUSS CONNECTIONS | | | IDLE MODULE |
|---|---|---|---|---|---|---|
| SR1 | SR2 | SR3 | B1 | B2 | B3 | |
| 0 | 0 | 0 | LM1 | LM2 | LM3 | LM4 |
| 0 | 0 | 1 | LM1 | LM2 | LM4 | LM3 |
| 0 | 1 | 1 | LM1 | LM3 | LM4 | LM2 |
| 1 | 1 | 1 | LM2 | LM3 | LM4 | LM1 |

Fig. [illegible]

| OLD STATE | | | FAILURE | | | NEW STATE | | |
|---|---|---|---|---|---|---|---|---|
| SR1 | SR2 | SR3 | F1 | F2 | F3 | SR1 | SR2 | SR3 |
| 0 | 0 | 0 | 0 | 0 | 1 | 0 | 0 | 1 |
| 0 | 0 | 0 | 0 | 1 | 0 | 0 | 1 | 1 |
| 0 | 0 | 0 | 1 | 0 | 0 | 1 | 1 | 1 |
| 0 | 0 | 1 | 0 | 0 | 1 | 0 | 0 | 0 |
| 0 | 0 | 1 | 0 | 1 | 0 | 0 | 1 | 1 |
| 0 | 0 | 1 | 1 | 0 | 0 | 1 | 1 | 1 |
| 0 | 1 | 1 | 0 | 0 | 1 | 0 | 0 | 0 |
| 0 | 1 | 1 | 0 | 1 | 0 | 0 | 0 | 1 |
| 0 | 1 | 1 | 1 | 0 | 0 | 1 | 1 | 1 |
| 1 | 1 | 1 | 0 | 0 | 1 | 0 | 0 | 0 |
| 1 | 1 | 1 | 0 | 1 | 0 | 0 | 0 | 1 |
| 1 | 1 | 1 | 1 | 0 | 0 | 0 | 1 | 1 |

Fig. 1[illegible]

TRIPLE MODULAR REDUNDANCY/SPARING

This invention relates to an improved highly reliable computer system including means for detecting and correcting errors that occur in the logic module section of the system.

In the technical prior art, it is known to utilize masking redundancy techniques for detecting and correcting the failure of a computer system component. One specific technique of the prior art is triple-modular-redundancy (TMR), which is an approach based on voting for effectively correcting a single component failure. Additional background information on this type of correction system is presented in the paper "Probabilistic Logics and the Synthesis of Reliable Organism from Unreliable Components" by J. Von Neumann, *Automata Studies*, *Annals of Mathematics*, Princeton, pp. 43–98, 1956. The main drawback of the TMR approach is in the poor reliability achieved relative to the amount of hardware invested.

It is also known in the prior art to provide standby or sparing redundancy techniques for replacing a failed component with a standby or spare component. The main disadvantage of this system are that it involves extensive checking circuitry, requires computation and storage of diagnosis tests, and often overlooks transient failures.

The present invention was developed to avoid the above and other drawbacks of the known systems and to provide an improved computer correction system the operation of which is based on the novel combination of the prior masking-type error detection techniques with standby redundancy type correction techniques.

The primary object of the present invention is to provide an improved computer system including masking redundancy means for detecting and temporarily correcting failure of a logic module, and sparing redundancy means for substituting a spare module for the failed module.

A further object of the invention is to provide module reinsertion means, operable upon the failure of sufficient modules to use up all the spares provided, to substitute previously used failed modules for newly failed modules.

According to a more specific object of the invention, means are provided for distinguishing between a temporary or a permanent failure in the component. Consequently, in the event that the failure is only temporary, the previously removed component is free for reinsertion in the system upon failure of another component. On the other hand, if the failure is permanent, the system is so controlled that reinsertion of the component in the system will cause its removal.

A further object of the invention is to provide reconfiguration network means for selectively connecting a plurality of active and spare logic modules with a smaller number of output busses, in combination with state register and decision logic means for controlling the reconfiguration network means to bypass a failed active module and to substitute a spare module therefor. The decision logic means is responsive to the outputs of discriminator means connected between the output busses of the system, and to the outputs of state register means connected with the reconfiguration network means. In the preferred embodiment of the invention, the temporary failure correction and failure location means are of the triple redundancy type and the number of input and output busses, reconfiguration network means and discriminator means is three, said discriminator means being connected in delta across the output busses.

A more specific object of the invention is to provide a computer system of the type described above, wherein said decision logic means includes a failure detection section the inputs of which are connected with said discriminator means, said failure detection section being operable to produce failure signals indicative of the bus from which a bit is in error. The decision logic means is operable to locate the currently active failing module and to replace it with a spare by changing the value of the state register to effect network reconfiguration.

In accordance with a further object of the invention, the decision logic means includes a MASK register section for indicating the failure of a given module, and a normally blocked LAST register section for probing the MASK register to determine whether or not a logic module is being used for a second time. Conditioning means are operable to release the LAST register only after the last available spare logic module is in use. Finally, the decision logic means includes TEMP counter means for monitoring successive failures occurring in the logic modules prior to the release of the LAST register means, together with the circuitry for setting the state registers in response to the failure signals and the output signals from the TEMP counter and the LAST counter.

Another object of the invention is to provide a system of the type described above, wherein each of the three reconfiguration network means of the triple-modular-redundancy and spare redundancy computer system includes a number of planes equal to the number of lines in each logic module output bus, each plane including a plurality of AND circuits the number of which corresponds with the number of logic modules. Separate state registers are associated with each of the three sets of planes, respectively. In one embodiment of the invention, the system is described as including six logic modules, while in a second embodiment, the special case is described wherein the number of logic modules is four.

The foregoing and other objects, features and advantages of the invention will be apparent from the following more particular description of preferred embodiments of the invention, as illustrated in the accompanying drawings, in which.

Figure 1:
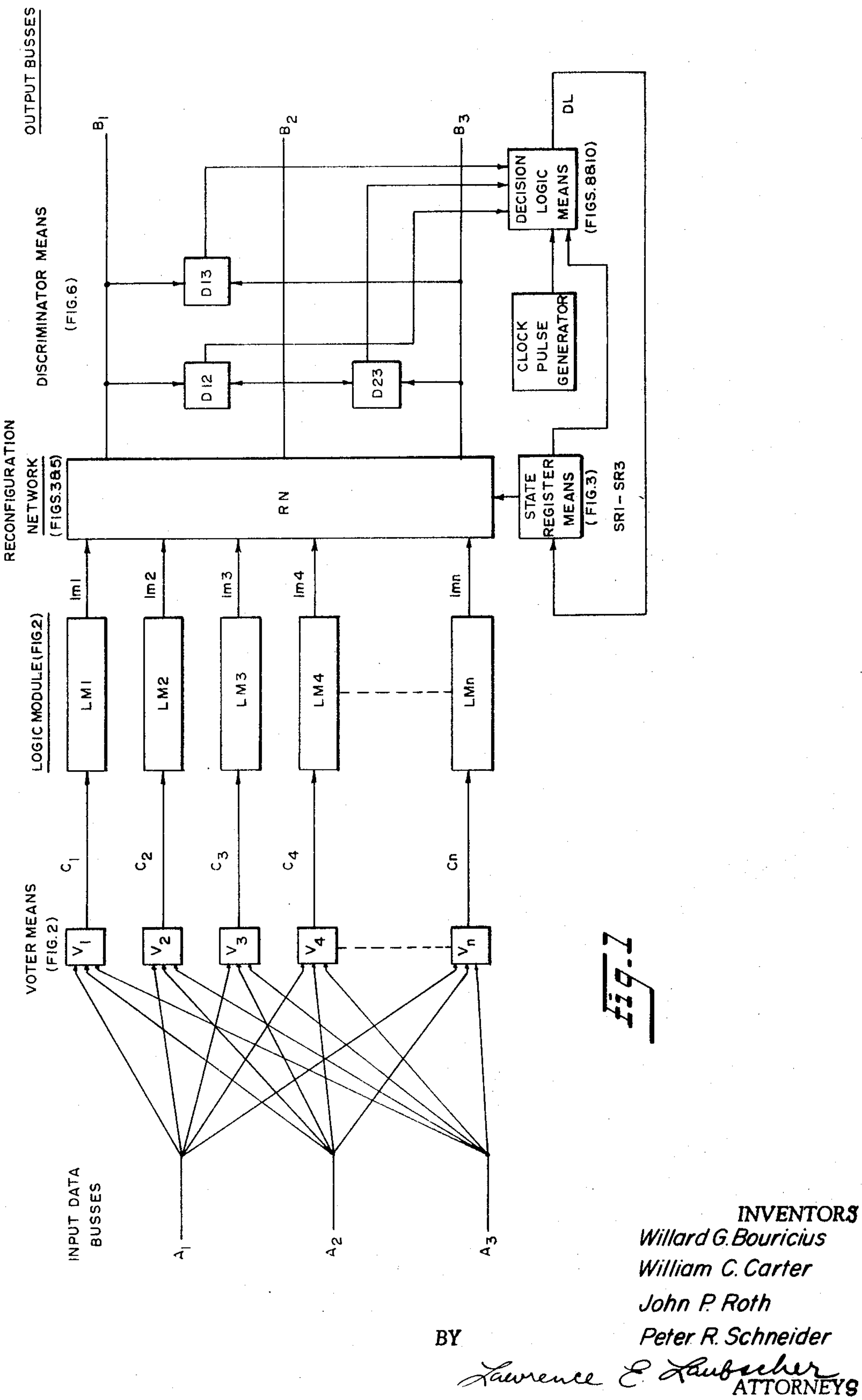
FIG. 1 is a block diagram of the triple-modular-redundancy/sparing computer system.
Figure 3:
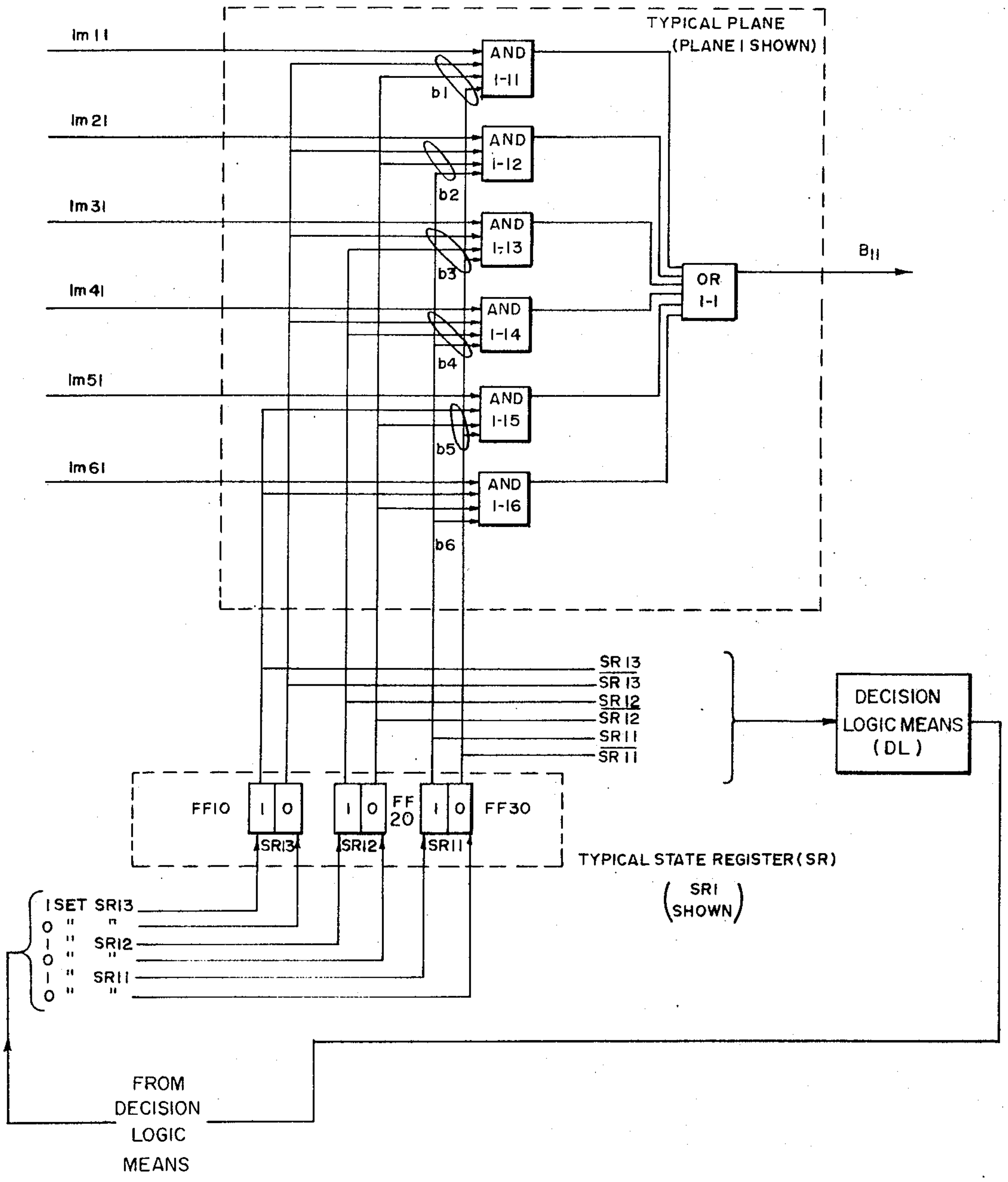
Figure 4:
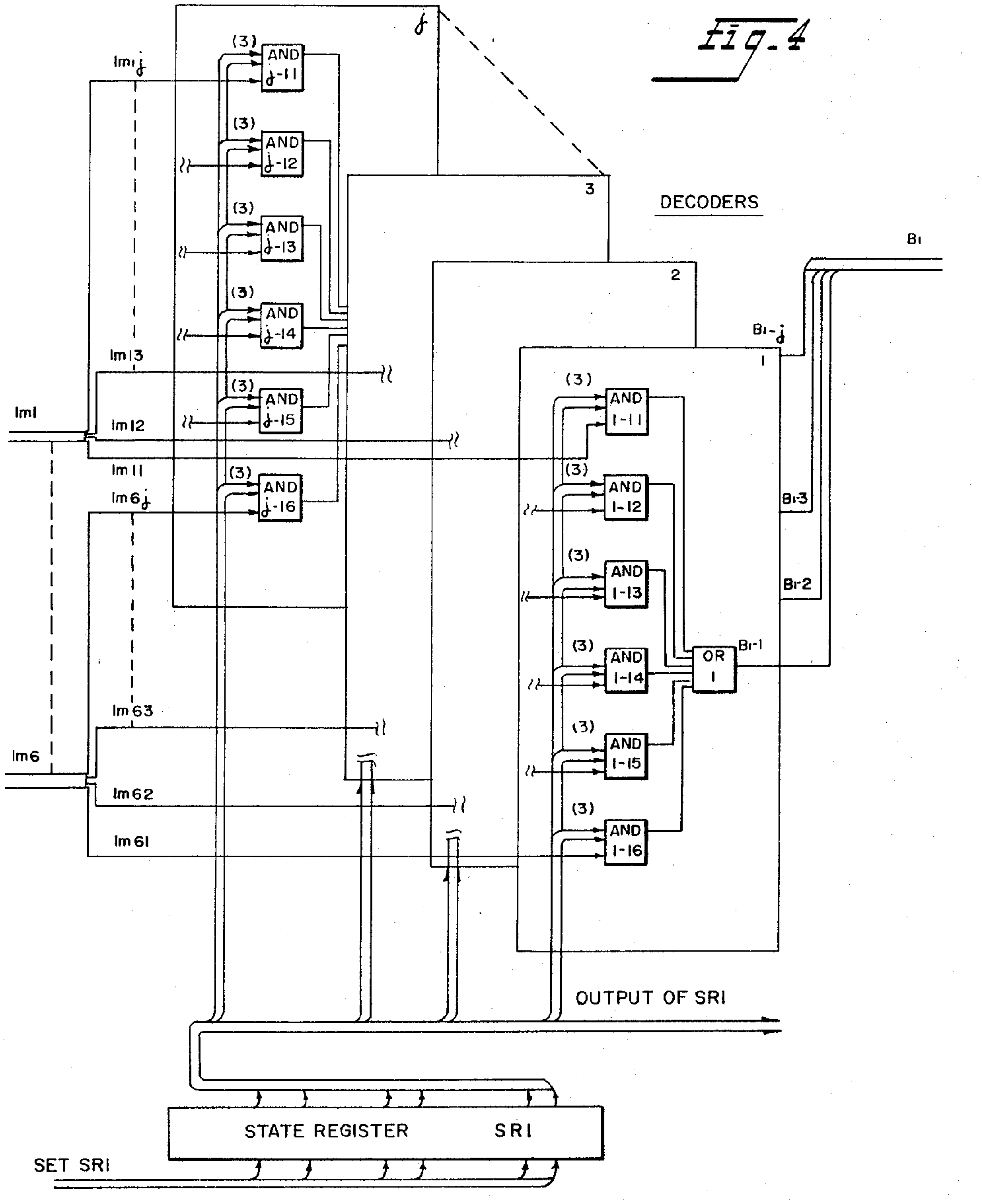
Figure 6:
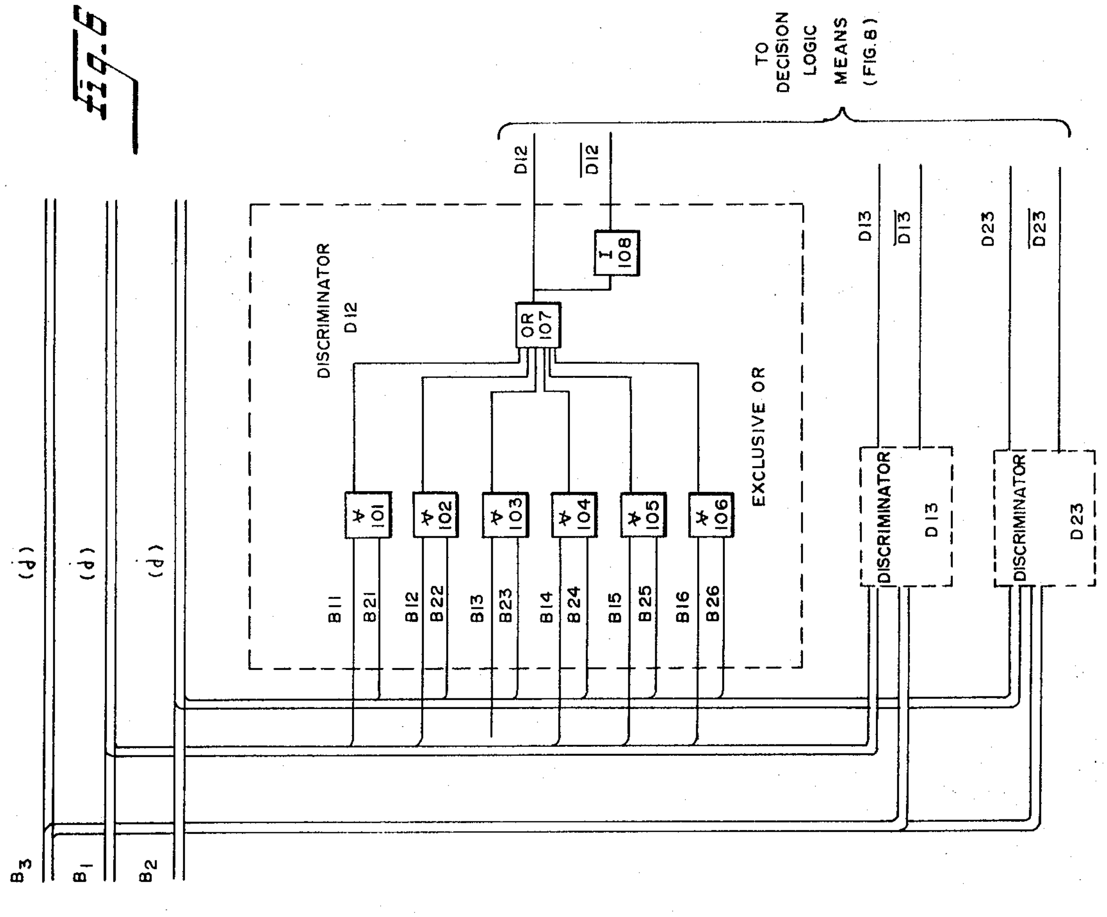
Figure 5:
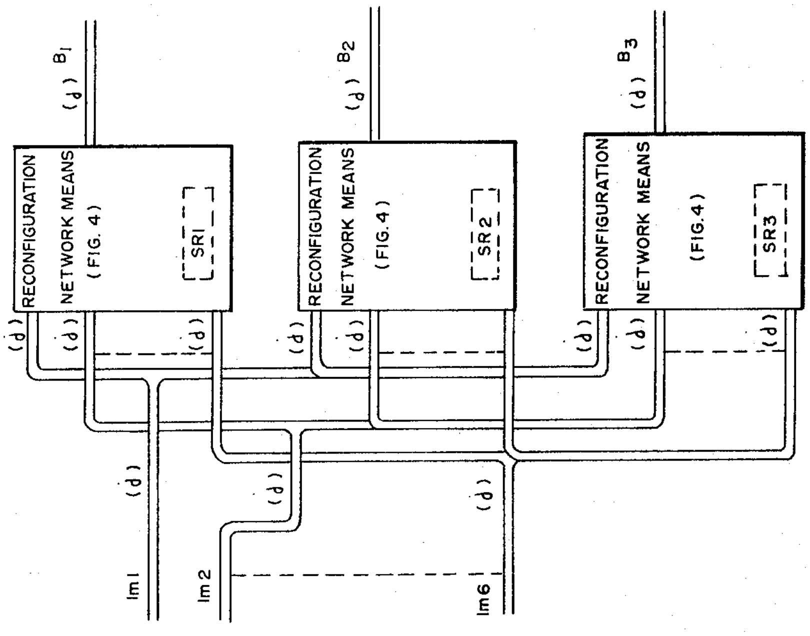
Figure 8:
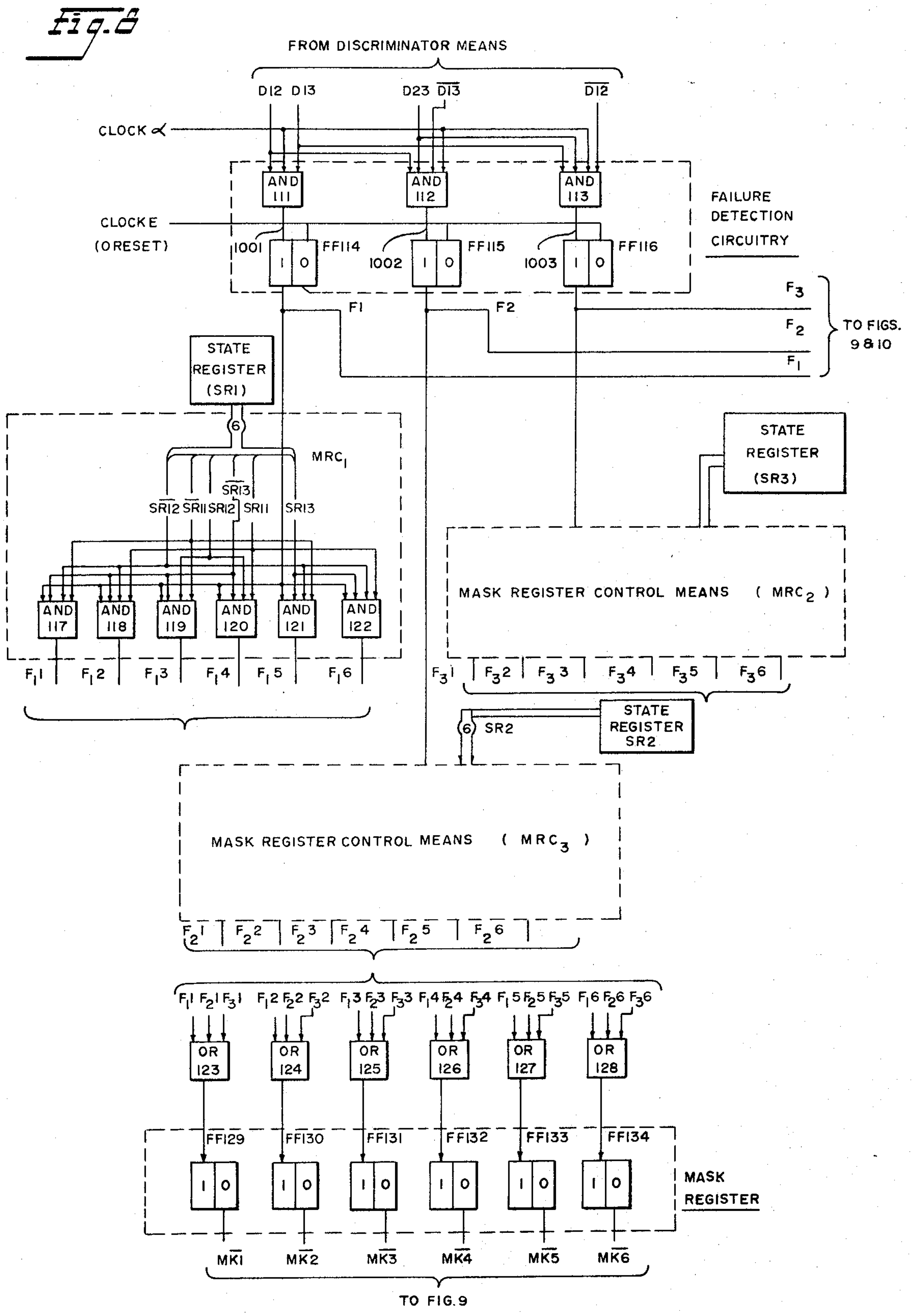
Figure 9:
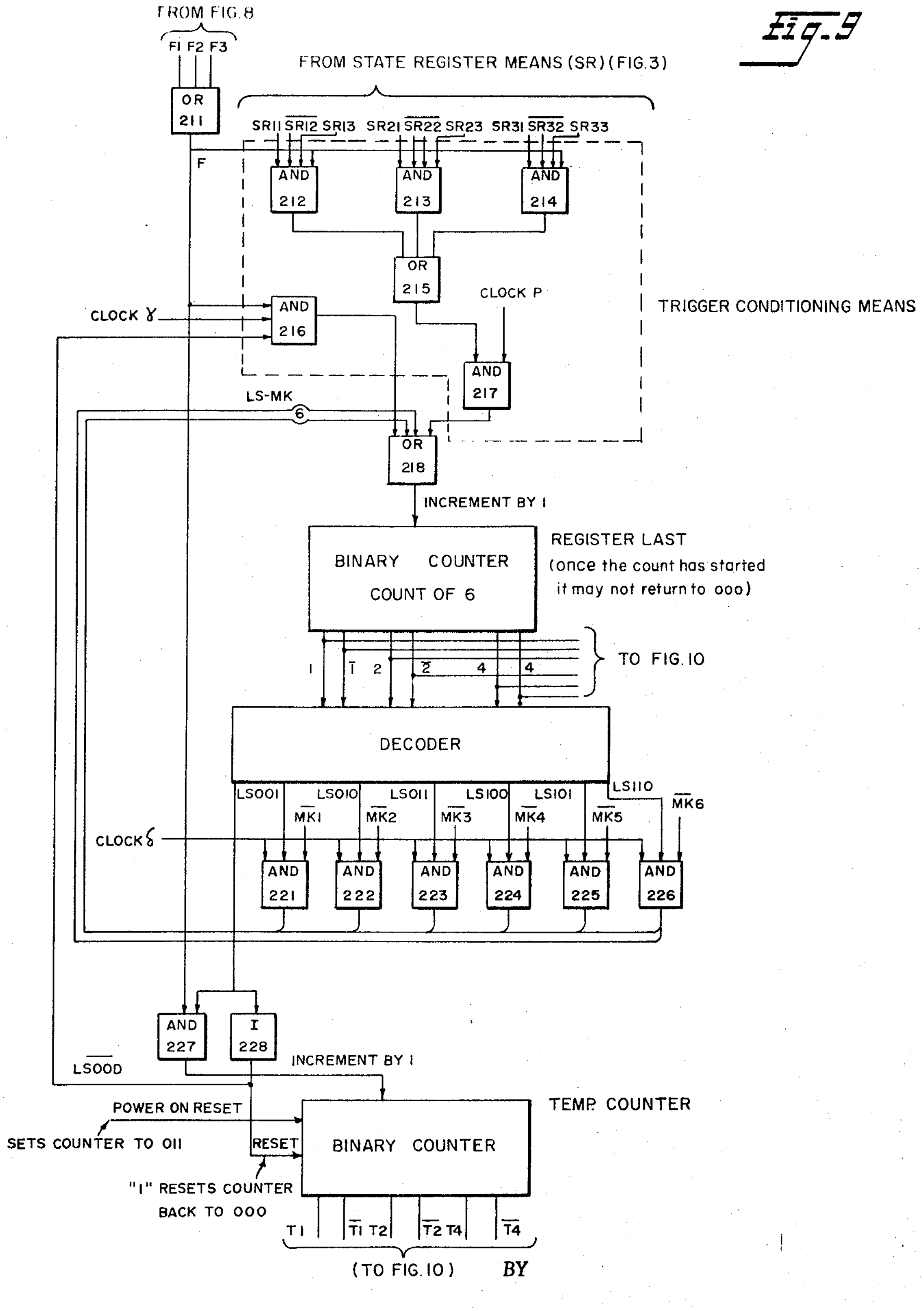
Figure 10:
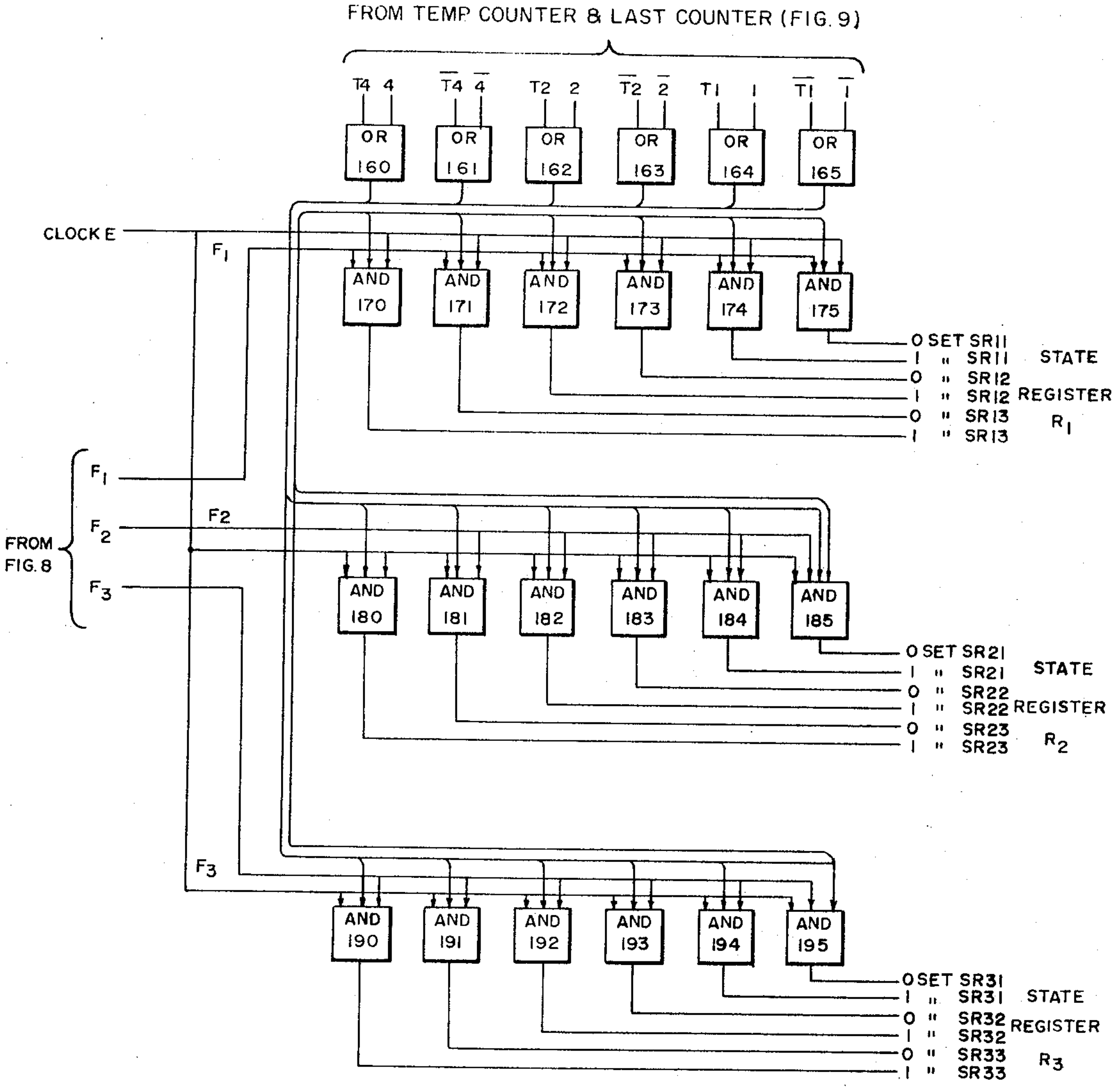
Figure 11:
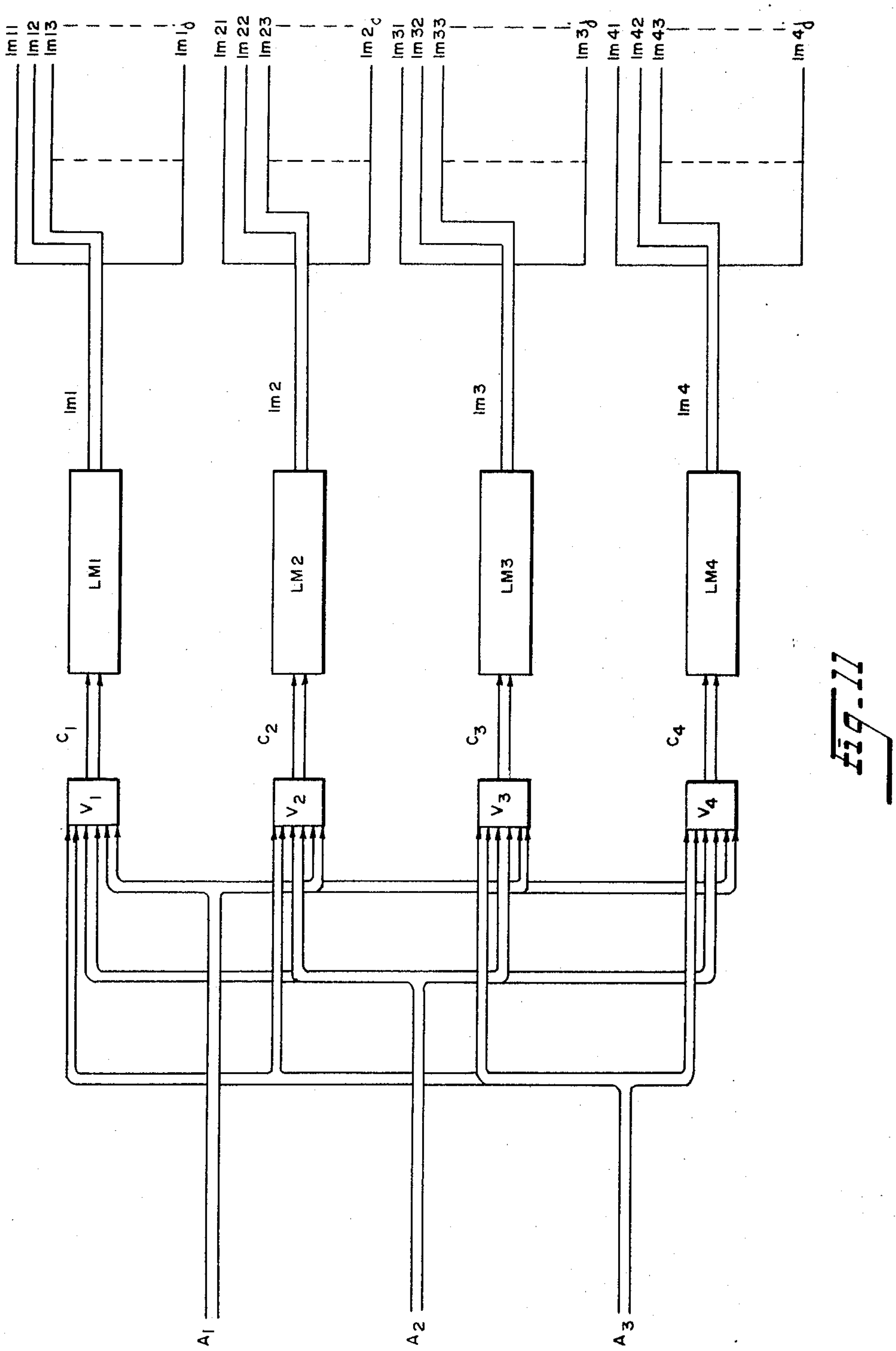
Figure 12:
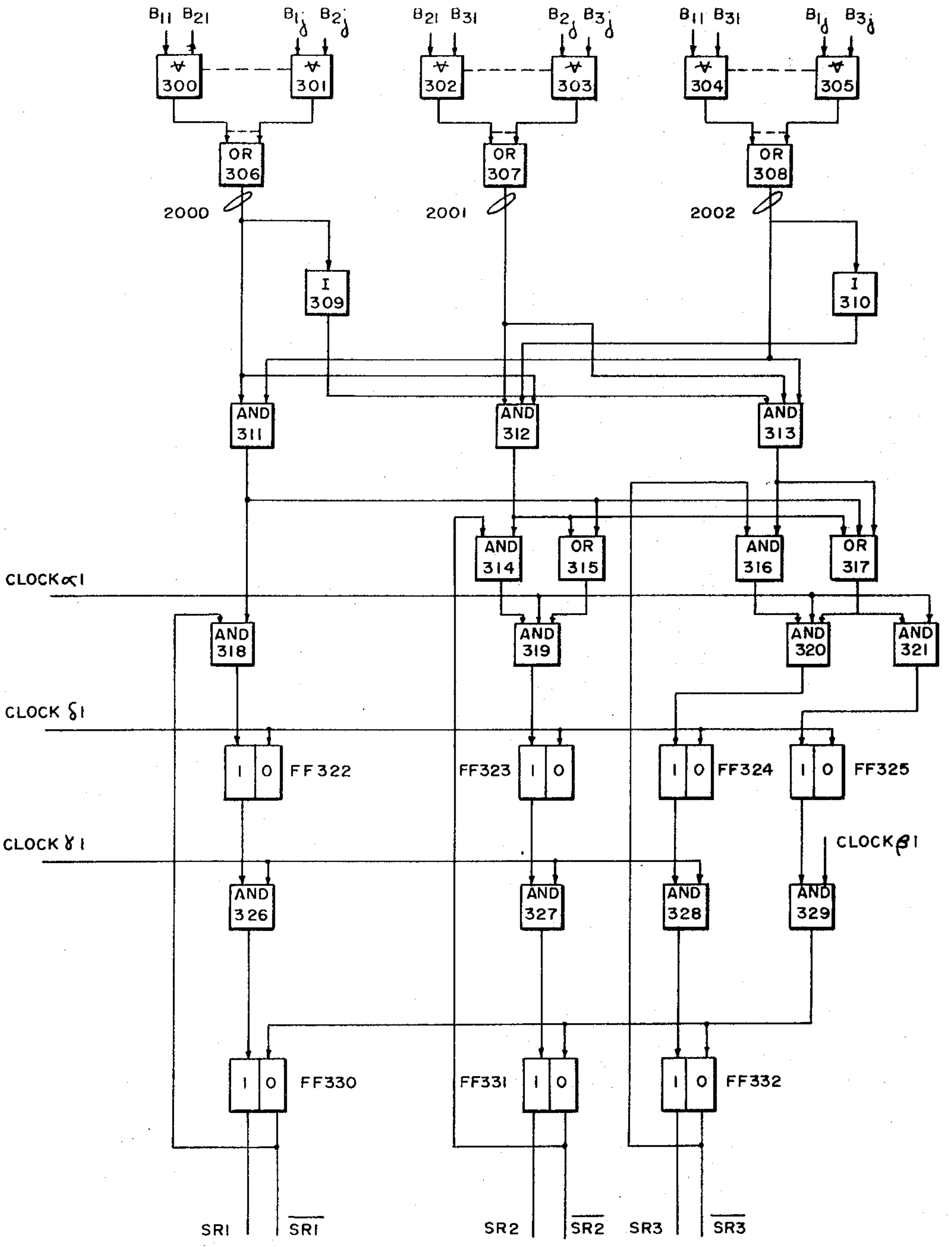
Figure 13:
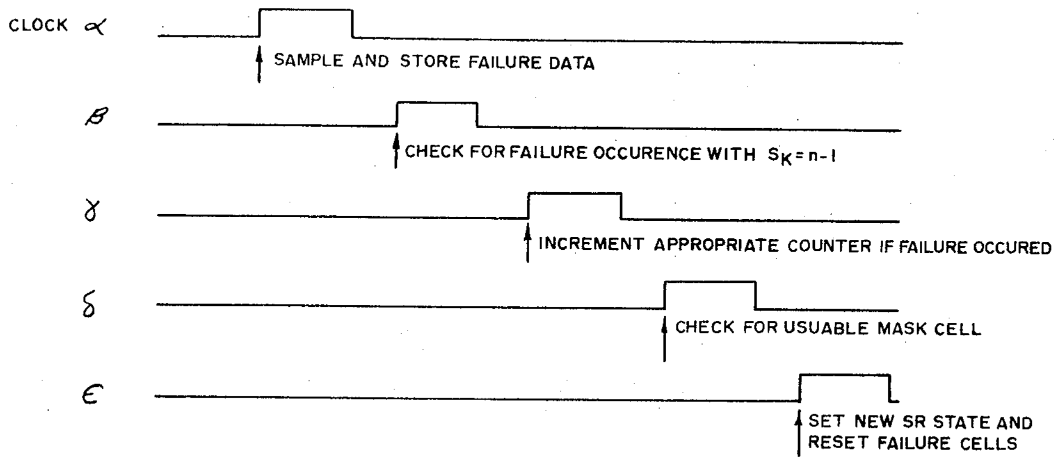
Figure 14:
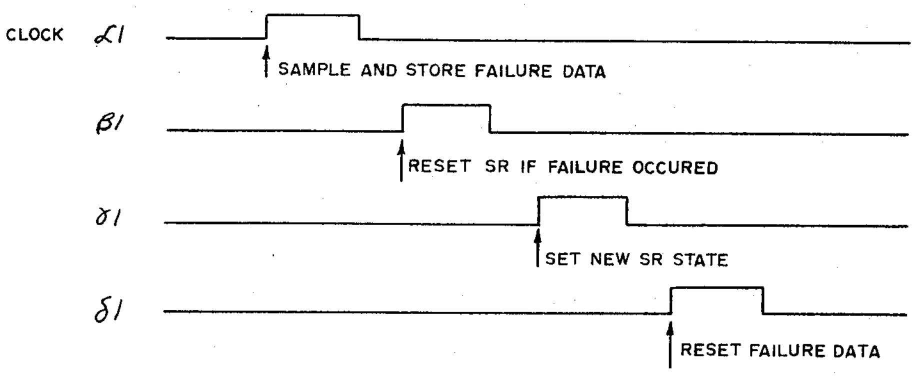
Figure 15:
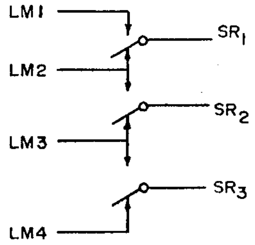

FIGS. 3–5 are schematic diagrams of the reconfiguration network means of FIG. 1, FIG. 3 illustrating the relationship between one plane of the network and the associated state register, FIG. 4 illustrating a typical group of planes of one reconfiguration network means, and FIG. 5 illustrating the relationships between the three reconfiguration network means and the logic module busses and the output busses;

FIG. 6 is a block diagram of the discriminator means;

FIG. 7 illustrates the switching sequence of the logic modules for the special case where the number of modules equals four;

FIGS. 8–10 are schematic diagrams of the logic decision means;

FIGS. 11 and 12 are block diagrams of the voter and logic module means and the reconfiguration network and decision logic means, respectively, for the special case where the number of decision logic means equals four;

FIGS. 13 and 14 are sequential timing diagrams illustrating the operations performed by the decision logic;

FIG. 15 illustrates a relay equivalent of the switching means for the special case where the number of logic modules is four; and FIG. 16 is a truth table showing the old and new states of the state registers upon the occurrence of a failure.

1. THE COMPUTER SYSTEM

Referring first to FIG. 1, the overall computer comprises three identical data busses $A_1$, $A_2$ and $A_3$, each of which contains a plurality of data lines. These three identical busses are connected to a set of voters that are in turn connected with a logic module LM, respectively. The outputs of these modules (represented as cables lm1 . . . lm*n*) are fed into a reconfiguration network (RN) which is controlled by a set of state registers. The outputs of the reconfiguration network consists of three identical busses, $B_1$, $B_2$ and $B_3$, each of which contains a total of *j* lines. In addition, a trio of discriminators D12, D23 and D13 are connected across the busses in a delta arrangement. Finally, a decision logic block controlled by the state registers, by a block and by the outputs of the discriminators affords a feed back control to the state register means.

The operation of this system is as follows.

When the system is put in operation, only three out of $n$ logic modules are activated (for example, LM1, LM2 and LM3). Identical data is transmitted through the three input busses $A_1$, $A_2$ and $A_3$ and is fed into all $n$ voters and thence to all $n$ logic modules.

The state register selects the logic modules to go into operation (for instance, initially LM1, LM2 and LM3 were selected), and data is transmitted to the output busses $B_1$, $B_2$ and $B_3$. Any discrepancy among the three output busses $B_1$, $B_2$ and $B_3$ is detected by the discriminators D12, D13 and D23, and for any divergence they generate a signal which is fed into the decision logic block. The decision logic block DL in turn changes the state of the state register SR. The switching of the failing module out of operation and the introduction of a new logic module to replace the failing one is performed by the reconfiguration network controlled by the decision logic block through the state registers.

At any one time only three logic modules are active in the sense of being connected to the output busses. The rest remain idle until switched into use when called for by the state register.

As it may be seen from this description, a triple modular redundancy (TMR) mode is used in addition to the sparing redundancy mode.

The operation of the system is sequential with the timing generated by the clock pulses.

2. TYPICAL VOTER MEANS

Figure 2:
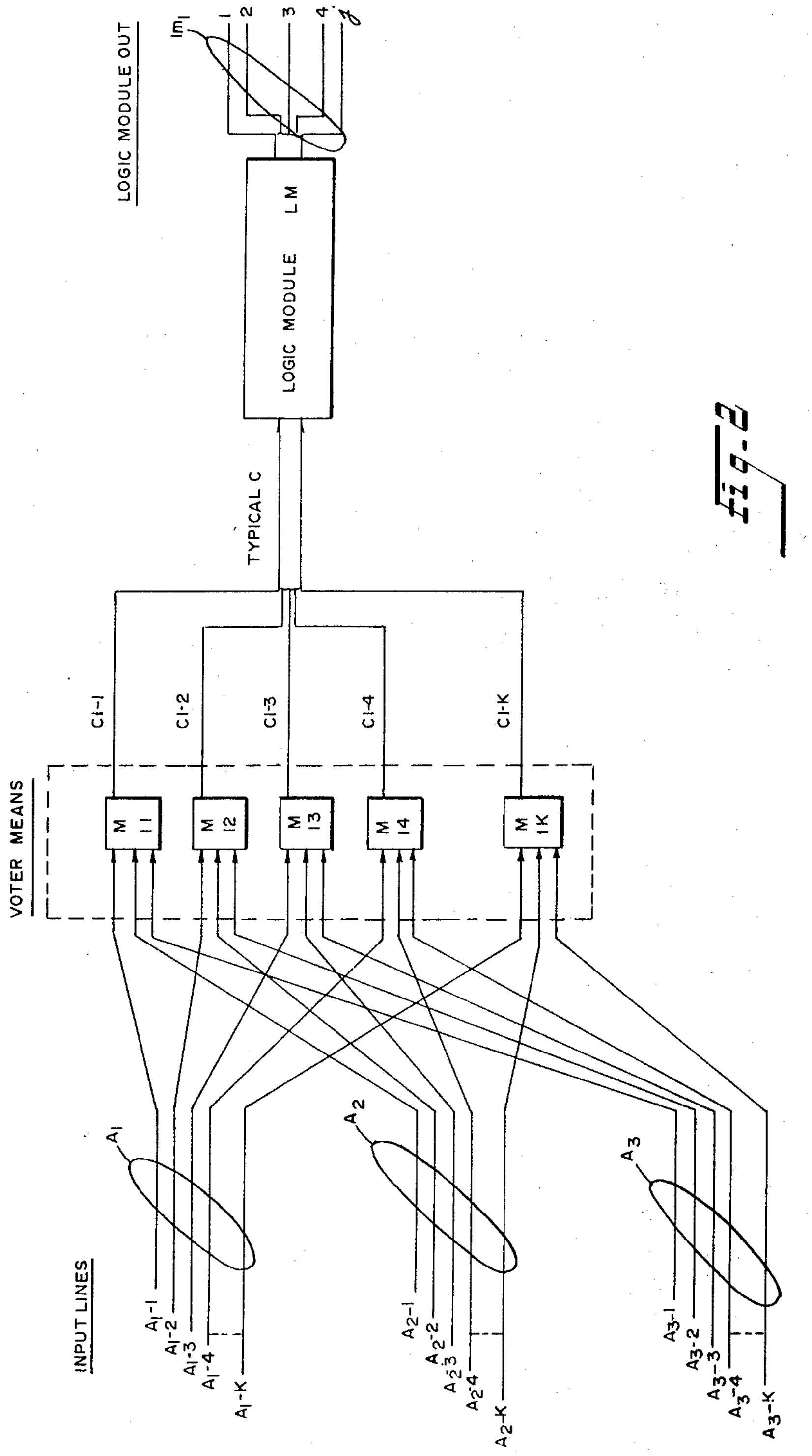
FIG. 2 is a schematic diagram of typical voter and logic module means.

Referring now to FIG. 2, a detailed view of a typical voter means is shown for the voter means $v_1$. The input busses $A_1$, $A_2$ and $A_3$ are decomposed each into K individual lines — namely, $A_{1\text{-}1}$ ... $A_{1\text{-}K}$; $A_{2\text{-}1}$ ... $A_{2\text{-}K}$; and $A_{3\text{-}1}$ ... $A_{3\text{-}K}$. Recalling that all three busses are identical it follows that under non-failing operation $A_{1\text{-}1}=A_{2\text{-}1}=A_{3\text{-}1}$; ......; $A_{1\text{-}K}=A_{2\text{-}K}=A_{3\text{-}K}$.

The corresponding lines are fed into a set of K majority circuits in groups of three lines each (i.e., $A_{1\text{-}1}$, $A_{2\text{-}1}$, $A_{3\text{-}1}$; $A_{1\text{-}2}$, $A_{2\text{-}2}$, $A_{3\text{-}2}$; ... ; $A_{1\text{-}K}$, $A_{2\text{-}K}$, $A_{3\text{-}K}$). Consequently, the first group is connected to majority circuit M11, and the second to M12, and the $k^{th}$ one of M1K.

The purpose of each of these majority circuits is to generate the majority function $A_{1i}A_{2i} \vee A_{1i}A_{3i} \vee A_{2i}A_{3i}$ for each line $i=1,2,\ldots,K$ in the input bus.

The outputs of the majority circuits M11, ... , M1K shown as $c_{1\text{-}1}$, ... , $c_{1\text{-}K}$ are fed into a logic module which may contain an arbitrary amount of logic. This logic module in turn has $j$ outputs, represented by lm11, ... , lm1$j$.

Since there are n identical logic modules, each will have $j$ outputs and will be fed by the output $c$ of its corresponding voter.

3. STATE REGISTER

Referring to FIG. 3, assume for descriptive purposes that the total number of logic modules is $n=6$. The purpose of this assumption is to simplify the description and deal with numerical values rather than the more general notation of $n$. Needless to say that the selection of $n=6$ does not impair in any respect the generality of the conclusions to be drawn or the descriptions to be made.

Since the triple modular redundancy aspect of the scheme calls for three input busses and three output busses, it is obvious that also three state registers SR1, SR2 and SR3 will be required. Since this illustration of the general case is limited to a total of six logic modules, each register requires six positions. Subsequently three cells suffice to implement each state register.

A typical state register is shown in FIG. 3 with each cell shown as a flip-flop.

When power is first turned on, the three state registers are in their respective initial positions $S_1$=000, $S_2$=001, $S_3$=010. For the $S_1$ register shown in FIG. 3, it means that flip-flops FF10, FF20 and FF30 are in the state 0. To identify each cell of the state register, the nomenclature SR11, SR12 and SR13 is used for the state register 1, with SR11 corresponding to the first cell, etc. Similarly, SR21, SR22 and SR23 apply to SR2 and SR31, SR32 and SR33, to SR3.

Each cell may be "0 set" or "1 set" depending which input of the flip-flop is activated.

4. RECONFIGURATION NETWORK MEANS

Each of the three reconfiguration network means is basically a set of decoders which are positioned in a series of planes, as shown in FIG. 4. The number of planes is determined by the number of individual lines in each bus lm. Since there are $j$ lines in each buss, there are $j$ planes.

The circuit arrangement of a typical plane is shown in FIG. 3. This plane contains a decoder which consists of six AND-circuits feeding into an OR-circuit.

Each AND-circuit has four inputs, three of which originate at the state register, (with one input for each cell) and the fourth being the appropriate line from the lm bus.

Each group $b$ of three lines emerging from the state register corresponds to a different state which the register may take. Thus, the first group lines $\overline{SR11}$, $\overline{SR12}$, $\overline{SR13}$, correspond to the state 000, the second group lines $\overline{SR11}$, $\overline{SR12}$, $\overline{SR13}$, correspond to the state 001, and so forth.

The number of AND-circuits in the decoder is determined by the number of busses lm. For our case, there are six AND-circuits.

Since the TMR mode calls for a triplication of each network, there are three functional arrangements shown as FIG. 4. This is illustrated by FIG. 5, wherein the system includes three of the arrangements of FIG. 4, giving rise to three identical output busses $B_1$, $B_2$ and $B_3$, each of which is composed of $j$ lines.

The state register associated with $B_1$ is SR1, with $B_2$ SR2 and with $B_3$, SR3. Particular note should be made to the fact that there is only one state register associated with each set of $j$ planes. The operation of the reconfiguration network is as follows.

Since initially the logic modules LM1, LM2 and LM3 are active, SR1 is set at 000, SR2 at 001, SR3 at 010. Referring to FIG. 3, it is noted that the AND-circuit 1–11 is active since the state register SR1 is in the state 000. Thus, lines $\overline{SR11}$, $\overline{SR12}$ and $\overline{SR13}$ are energized, while all other state register lines remain inactive. Consequently, any data transmitted through lm 11 enters the OR-circuit 1–1 and exits through $B_{11}$.

Referring to FIG. 4, it is noted that since there is only one state register associated with all the planes, simultaneously all AND-circuits 1–11, 2–11, 3–11, . . . , $j$–11 become active, and the date correspondingly exits through $B_{11}$, $B_{12}$, $B_{13}$, . . . , $B_{1j}$.

A note should be made on the nomenclature used for the AND-circuits of the decoders. Consider the character $j$–13. The first digit $j$ corresponds to the plane in which this AND-circuit is located (see FIG. 4). The second digit 1 refers to the output bus (or state register) with which the circuit is associated (see FIG. 5). Finally, the third digit 3 corresponds to the position of the circuit in any given plane (see FIG. 3). Consequently, the AND-circuit $j$–13 is in the $j^{th}$ plane in FIG. 5 (which is associated with the output bus 13 and it is the third circuit down the line (that is, associated with the line lm3$j$).

Referring now to FIGS. 4 and 5, the identical data that is transmitted through $B_1$ is simultaneously flowing through $B_2$ and $B_3$. This date originated from $A_1$, $A_2$, $A_3$, and was assumed to carry identical information. Consequently, data flows through the AND-circuits 1–11, 2–11, . . . , $j$–11 since the state register SR1 is in the state 000 (which activates LM1). Also, since SR2 is in the state 001, it follows that the logic module LM2 is in operation so that AND-circuits 1–22, 2–22, . . . , $j$–22 becomes active, and the data is transmitted to $B_2$. Finally, with SR3 in the state 010, the logic module LM3 is in operation, and the AND-circuits 1–33, 2–33, . . . , $j$-33 are also active, thus transmitting the date to $B_3$.

5. DISCRIMINATOR MEANS

Referring to FIG. 6, three discriminators D12, D13, and D23 are tied across the three outputs in a delta arrangement.

Each output consists of j individual lines, and therefore, each discriminator is made of *j* exclusive OR-circuits (101 through 106) with two input lines each. The outputs of the *j* exclusive or-circuits enter an OR-circuit which in turn is connected to an inverter (circuit 108). As a result, each discriminator has two outputs — a true and a complement.

Referring again to FIG. 6, for the discriminator D12, each corresponding individual line of $B_1$ and $B_2$ is connected to the inputs of the exclusive OR-circuits. It follows that $B_{11}$ and $B_{21}$ must be tied to circuit 101, $B_{12}$ and $B_{22}$ to circuit 102, . . . $B_{16}$ and $B_{26}$ to circuit 106. The same applies to the discriminators D13 and D23 — for D13, lines $B_{11}$ and $B_{31}$ must be matched, . . . , up to $B_{16}$ and $B_{36}$; for D23, lines $B_{21}$ and $B_{31}$ must be matched , . . . up to $B_{26}$ and $B_{36}$.

6. DECISION LOGIC MEANS

The decision logic means (FIGS. 8–10) may be subdivided into the following five distinct sections:

a. A failure detection mechanism circuitry (circuits 111 through 116 in FIG. 8).

b. A MASK register with its control circuits 123–134 (FIG. 8).

c. A LAST register with its control circuits 211 through 266, including the binary counter and its decoder (FIG. 9).

d. A TEMP counter (FIG. 9), and e. The state register setting circuitry (FIG. 10).

The failure detection mechanism circuitry consists of three AND circuits (circuits 111, 112 and 113) whose inputs are, respectively, D12, D13; D23, D12 and $\overline{D13}$; D13, D23 and $\overline{D12}$. Each AND circuit further includes a timing input (clock $\alpha$).

At each clock time $\alpha$, the data bit is sampled. If the data bit is present at all three output busses $B_1$, $B_2$ and $B_3$, no signal is generated at the output of any exclusive OR-circuit (FIG. 6). It follows that none of the lines D12, D13 or D23 is active and, as a result, no signal appears at lines 1001, 1002 and 1003. This condition clearly shows that no failure has occurred.

Assume that at time $\alpha$, a bit which was supposed to be present in line $B_{11}$ (from bus $B_1$) fails to appear. At the same time, however, a bit is present in line $B_{21}$ (from bus $B_2$). Since $B_{11}$ has a 0 and $B_{21}$ a 1, the output of the exclusive OR-circuit 101 becomes active. This in turn activates the output of the OR-circuit 107. Thus a 1 shows on line D12 and a 0 on line $\overline{D12}$.

Since line $B_{11}$ "failed", there is also a circuit in D13 corresponding to the exclusive OR-circuit 101 in FIG. 6 which is activated. As a result line D13 shows a 1 and line $\overline{D13}$ is a 0.

Assuming that the three flip-flops FF114, FF115 and FF116 (FIG. 8) are initially set to 0 when the system is put in operation, it will be seen with regard to circuit 111 that since both inputs D12 and D13 have a 1, at the time $\alpha$, line 1001 will be active, thus storing a 1 in flip-flop 114.

Thus, the absence of a bit in bus $B_1$ when it was supposed to be present, generates a failure signal F1. In a similar manner, the absence of a bit which was supposed to be present (or its presence if not bit should show) in bus $B_2$ activates lines D23 and D12, thus generating a signal at line 1002. Finally, a failure in bus $B_3$ activates lines D13 and D23, thus giving rise to a signal 1 in line 1003.

In order to handle the case when simultaneously all three discriminator outputs become 1, the circuits 112 and 113 are provided with additional input lines $\overline{D13}$ and $\overline{D12}$, respectively.

With the present step, line 1002 becomes active only if D13 remains at 0. Similarly, line 1003 stays at a 1 only if D12 remains at 0.

Assume that D12, D13 and D23 are all at 1. Then, only the circuit 111 becomes active and just one of the failures is handled in that particular machine cycle. The other failures remain until the next machine cycle arrives. This way, a complete breakdown of the failure detection mechanism is avoided.

The MASK register consists of as many cells (flip-flops) as there are logic modules. For the general case presently treated, there are six cells.

The purpose of the MASK register is to store a 1 in the appropriate cell whenever a failure is detected in the logic module related to that MASK cell. Thus an operator may visually determine the failing modules.

Assume that logic modules LM1, LM2 and LM3 are operating. Should LM1 fail, a 1 is stored in flip-flop 129 (FIG. 8). As explained before, LM1 is dropped while LM4 is switched on. Assume that now LM2 fails. A 1 is stored in flip-flop 130. Then LM2 is switched off while LM5 switches on. Finally, assume that LM4 fails next. A 1 is stored in flip-flop 132. LM4 is switched off and the last available spare module LM6, which had never failed before, is brought into operation. Any further failure will now face the reuse of one of the logic modules that has already failed once.

It is important at this point to distinguish between a temporary failure and one of a permanent nature. If the first module LM1 which failed had a temporary failure, then if another module (for instance, LM3) fails, the next available module to be turned on will be LM1 and the operation of the system will continue with LM1, LM5 and LM6. If, however, the nature of LM1 failure was permanent, then as soon as LM1 is brought into operation a failure will appear forcing the system to disconnect it. It is obvious that if all failures were permanent, there would be a constant bouncing between the logic modules.

Each MASK register control means ($MRC_1$, $MRC_2$, $MRC_3$) consists of a six positions decoder which gates each state of the state register with the output of the failure flip-flop (FF114 for F1). Thus, the AND-circuit 117 has four inputs, namely, the output F1 of flip-flop 114 and three inputs which correspond to $\overline{SR11}$, $\overline{SR12}$ and $\overline{SR13}$ (this is, to the state 000 of the register SR1). The output of the AND-circuit 117 is line "$F_1$1" to indicate that $F_1$ is gated with the first state of SR1. The same applies to the remaining circuits 118 through 122.

In a similar manner, the six states of SR2 are gated with the output F2 of flip-flop FF115 and the six states of SR3 with the output line F3 of flip-flop FF116.

The corresponding outputs $F_1$1, $F_2$1, $F_3$1; $F_1$2, $F_2$2, $F_3$2; $F_1$6, $F_2$6, $F_3$6 are OR-ed in groups of three (circuits 123 through 128) and the outputs of those OR-circuits 123 through 128 are respectively tied to the 1 input of the flip-flops FF129 through FF134.

Suppose a failure is stored in FF114 and assume SR1 to be in its state 010. Line F1 becomes active, and since the output lines of SR1 — $\overline{SR11}$, SR12 and $\overline{SR13}$ — are at 1 the AND-circuit 119 is energized, thus activating line $F_1$3. This line, in turn, energizes the OR-circuit 125 which stores a 1 in flip-flop 131, thus indicating that LM3 has failed.

Referring to FIG. 9, it will be remembered that when all available spare modules were used once, it became necessary to reuse some of those which had failed.

It is important for an operator to know which one of the logic modules is used a second time. This function is performed by the normally blocked register LAST, (FIG. 9).

This register LAST may be visualized as a ring counter, and associated with LAST is a six positions decoder, with each position representing one of the six possible states in which LAST may find itself. This decoder is necessary to control the circuitry used for incrementing the count of LAST.

Before releasing LAST from its initial state 000, one must insure that the last available spare logic module is presently being used.

The "triggering condition" is generated by circuits 212 through 217, and they operate in the following manner: AND-circuits 212 through 215 decode the state 5, (binary 101) the last state of each state register — circuit 212, of SR1; circuit 213, of SR2; and circuit 214 of SR3. (Note, that since the count of the state register starts at 000, the sixth and last state corresponds to 101, or decimal 5.) It follows that when LM6 is switched into operation, one of the state registers will have reached state 101. This condition gated with a failure will activate one of the inputs of the OR-circuit 215 (depending which state register reached that state), and by activating the OR-circuit 218 at time B (see FIG. 13), its output release LAST from its count 000.

Once LAST is removed from its state 000, the count increment may be achieved in two ways.

The first way makes use of circuits 211, 216, 218 and 228.

With LAST out of its state 000, any new failure necessarily forces the reuse of a logic module which had previously failed. It follows that the OR-circuit 211 whose Boolean equation is F1 V F2 V F3 will step LAST whenever its output is activated. Two conditions must, however, be met. The first is that LAST be out of 000. A 1 in line $\overline{LS000}$ indicates such a condition. The second is that it happen at time $\alpha$ (see FIG. 13). Then, any signal generated at line F will increment LAST count.

The second way of stepping LAST up is through the decoders and circuits 221 through 226.

The operation of this circuit arrangement is as follows. Having removed LAST from 000, each cell of MASK is sequentially probed to determine whether there is a 0 or a 1 in that particular cell. If there is a 0, it means that the logic module that corresponds with that cell will presently be in operation (since it has never failed). It follows that under these circumstances, it may not be used. Consequently, the next cell of MASK is probed. Assume it has 1. This means that the logic module associated with that cell had failed previously and had been switched off. Therefore, it is ready to be reused once again.

From this reasoning one may conclude that a 0 in a given MASK cell is the condition which inhibits the use of that logic module, and LAST must be updated so as to allow the probing of the cell next in line.

Assume the count of LAST to be at 001. Then, line LS001 from the decoder is the only active "LS" line. At time $\alpha$, MASK is probed. Assume that the first cell (FF129) has a 0 stored in it. It follows that line MK1 is at 1. Since all three inputs of circuit 221 are at 1, then its outputs will also be at 1, thus allowing a signal to be fed to the OR-circuit 218. This in turn steps the count of LAST by 1. As a result, line LS010 emerging from the decoder is now active. At time $\alpha$, MASK is again probed. Assume now that the second cell (FF130) of MASK has a 1 stored in it. Consequently line MK2 is at 0. This inhibits the AND-circuit 222, thus leaving LAST at that count, where it will remain until a new failure occurs.

Referring now to the functional block TEMP counter, from the previous discussion, it is obvious that a counter must keep track of successive failures occurring in the logic modules before LAST is entered in the operation. Otherwise there would be no way of setting the state registers in their new state. This is accomplished by a temporary counter — TEMP counter — which is active as long as LAST remains in its count 000.

When power is turned on, the TEMP counter is set at the count three, whereupon SR1 switches on LM1, SR2 switches on LM2, and SR3 switches on LM3. The next logic module to be switched on must be LM4, and therefore, the appropriate state register is set to state 4 (that is to 011).

The TEMP counter is stepped up by line F. The counter increments its count from 3 to 5 (or in the more general case, from 3 to $n$-1, where $n$ is the number of spare logic modules). Once the count 5 is reached, TEMP is reset to 0, and is inhibited from counting by the LAST counter.

Referring to FIG. 10, the state register control means are designed to set the appropriate state registers to their new states. Circuits 160 through 165 generate signals emerging from the counters LAST or TEMP. Thus if TEMP is active and its count is 011, it follows that the outputs of OR-circuits 161, 162 and 164 will be at 1, while the outputs of 160, 163 and 165 will be at 0.

At time $\epsilon$, one of the three groups of circuits 170–175; 180–185; 190–195 is activated, depending on whether the failure was F1 or F2 or F3, respectively. By applying a 0 or a 1 at the appropriate outputs of the AND-circuits signals are generated which are transmitted to the cells of the appropriate state registers, thus setting them in their new state. As an illustration, assume F1 to be at 1. At time $\epsilon$, AND-circuits 170–175 are probed and the outputs 171, 172 and 174 are energized (for TEMP at 011), while outputs 171, 173 and 175 remain at 0. Referring now to FIG. 3, it follows that a 0 stored in FF10, a 1 both in FF20 and FF30. Then if F2 were the failure signal, circuits 180 through 185 would be active, and state register SR2 would be set in its new state. Finally, if F3 were the failure signal, the transmission path would be circuits 190 through 195 and from there to state register SR3.

Referring now, finally to FIG. 13, the timing sequence, it may be seen from the timing diagram that there are five timing sequences.

At time $\alpha$ (or clock pulse $\alpha$), a failure signal is stored in the appropriate flip-flop (FF114, FF115, FF116). At times $\beta$, $\gamma$ and $\delta$, LAST count is incremented through one of three possible paths.

At time $\epsilon$, the state registers are set in their new state and the failure flip-flops (FF114, FF115, FF116) are reset back to 0.

SPECIAL CASE ($n$=4)

Refer to FIGS. 11 and 12 for the logic arrangement of the functional blocks and to FIG. 14 for the timing.

The special case of $n=4$ differs only in reconfiguration network and in the decision logic. Both of these may be simplified.

FIG. 11 shows a schematic diagram of the four logic modules (three of which are in operation and one is idle as a spare) LM1, LM2, LM3 and LM4 and the voters V1, V2, V3 and V4 associated with them in the same manner as explained in the general case. Also shown are the three identical input busses $A_1$, $A_2$ and $A_3$. Finally the outputs of the logic modules are shown as lm1, lm2, lm3 and lm4, each of which contains a plurality of $j$ lines.

The arrangement shown in FIG. 11 leads to a series of arrangements similar to those shown in FIGS. 3, 4, and 5. These have not been drawn, since they are equal in all respects to their general counterpart, with the only exception that $n = 4$ instead of $n=6$, as was illustrated for the general case.

FIG. 12 shows the discriminators (circuits 300 through 308), the failure detection circuits (circuits 309 through 329) and the state registers SR1, SR2 and SR3 (flip-flops 330 through 332).

The operation of the failure detection circuit arrangement is as follows.

It will be recalled from the description of the general case that at each instant of time, the same identical signals arrive at lines 2000, 2001 and 2002. If a bit fails to appear (or is present when it should not be) in any one of the three lines, one of the three AND-circuits 311, 312 or 313 will be activated in the same manner as was explained in the general case, thus generating a failure signal.

The switching circuitry associated with the state registers (FF330, FF331 and FF332) and the storing of the data in their respective cells (FF322, FF323, FF324) is represented by circuits 314 through 320.

This switching circuitry may be schematically represented by means of relays, as shown in FIG. 15.

If the relay is in the "up" position, it is said to be in the 0 position, if down, it is assumed to be in the 1 position.

From the way the logic modules LM1, LM2, LM3 and LM4 are "connected" to SR1, SR2 and SR3, it follows that the only possible states SR1, SR2 and SR3 may take are respectively 000, 001, 011, 111.

Let us determine now, how the state registers should be set in their new state if a failure occurs. The truth table (FIG. 16)

shows in each instance, which failure occurred (F1, F2 or F3) and how the state registers are set in their new states.

A quick analysis of this truth table shows that the Boolean expressions for the new state in terms of the old states and the failures are the following.

$$\text{New SR1} = F1 \wedge \overline{\text{Old SR1}}$$
$$\text{New SR2} = (F1 \vee F2) \wedge (\overline{\text{Old SR2}} \vee \overline{F2})$$
$$\text{New SR3} = (F1 \vee F2 \vee F3) \wedge (\text{Old SR3} \wedge F3)$$

The implementation of those Boolean equations is represented by circuits 314 through 320.

Referring now to FIG. 12 for the complementation and to FIG. 14 for the timing. At time $\alpha$1, a failure is stored in the appropriate cell. FF322 or FF323 or FF324 depending on whether the failure was F1, F2 or F3, respectively.

At time $\beta$1, the flip-flop FF325 is activated by the occurrence of any one failure. This, in turn generates a signal at the 1 output of FF325 which resets all three state registers back to 0.

At time $\gamma$1, the state registers SR1, SR2 and SR3 are set to their new state. At this time, logic modules are switched in and out of operation by means of the reconfiguration network.

At time $\delta$1, the failure cells (FF322, FF323 and FF324) are reset back to 0, and the system is ready to sample once again for the appearance of a new failure. This, in turn, starts a new machine cycle.

Although not shown in detail for the special case of $n$ =4, the reconfiguration network switches the logic modules in the sequence shown below (FIG. 17).

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a computer system including a plurality of data input busses ($A_1$, $A_2$, $A_3$), a corresponding number of date output busses ($B_1$, $B_2$, $B_3$), a plurality of similar logic modules $LM_1$ – $Lm_n$) the number of which exceeds the number of date input busses, and voter means ($V_1$ – $V_n$) connecting each of said data input busses with the inputs of each of said logic modules, the improvement which comprises 1. reconfiguration network means (RN) normally connecting the output data busses with the outputs of a first set of said logic modules, respectively, the number of said first set of modules corresponding with the number of said output busses;
2. a plurality of discriminator means (D12, D13, D23) connected between different pairs of said output busses, respectively, each of said discriminator means being operable to produce a detectable signal whenever the date signals on the associated pair of output busses are dissimilar upon failure of a logic module; and
3. sparing means (DL, SR1-SR3) operable in response to said detectable signals for controlling said reconfiguration network means to initially substitute for a temporarily failed given logic module a spare logic module, and to subsequently substitute for a failed logic module said given logic module.

2. Apparatus as defined in claim 1, wherein said sparing means includes state register means (SR1, SR2, SR3) for controlling the operation of said reconfiguration network means, said state register means including a plurality of state registers the number of which corresponds with the number of input busses, each of said state registers including a number of storage positions corresponding with the total number of said active and spare logic modules.

3. Apparatus as defined in claim 2, wherein said sparing means further includes failure detection means (111–116) for identifying the failed logic module, and MASK register means including a plurality of cells corresponding with said logic modules, respectively, said MASK register means being operable to store an identifying signal in the cell that corresponds with said failed module.

4. Apparatus as defined in claim 3 wherein said sparing means further includes initially disabled LAST register means for probing successive cells of said MASK register means to determine whether or not a logic module is being used for a second time; and trigger conditioning means for enabling said LAST register means only after the last available spare logic module is in use.

5. Apparatus as defined in claim 4, wherein said LAST register means includes counter means for representing the state of said LAST register means, and means responsive to said failure circuit means and said state register means for incrementing the count of said counter means.

6. Apparatus as defined in claim 4, wherein said sparing means includes TEMP counter means for monitoring successive failures occurring in the logic modules prior to the enabling of said LAST register means.

7. Apparatus as defined in claim 4, wherein each of said state registers includes three bistable cells for providing true and complement outputs, respectively;

and further wherein said MASK register means includes three MASK register control means associated with said state registers and said failure detection means, respectively, each of said control means including a plurality of AND circuits the number of which corresponds with the number of logic modules, respectively, said control means being operable to gate each of the six states of the associated state register with the output of the associated failure means.

8. Apparatus as defined in claim 7, and further including a plurality of OR-circuit means for connecting groups of the outputs of said MASK register control means with the MASK register cells.

9. Apparatus as defined in claim 6, wherein said sparing means further includes state register setting means for setting the state registers in their new states, respectively, said setting means comprising three groups of normally disabled AND-circuits associated with said state registers, respectively, each of said AND-circuits having three inputs, clock means for applying an enabling signal to one input of each of said AND-circuits, OR-circuit means for applying the output signals of said TEMP register means and said LAST register means to second inputs or corresponding AND-circuits in each of said groups, respectively, and means for applying the failure signals to all of the third inputs of the AND-circuits of each of said groups, respectively, the outputs of each group of said AND-circuits being connected with the inputs to the cells of the associated state register means, respectively.

10. Apparatus as defined in claim 9, wherein each of said reconfiguration network means comprises a series of planes the number of which corresponds with the number of individual output lines of a logic module, each of said planes including a plurality of AND-circuits the number of which corresponds with the number of said logic modules, each of said AND-circuits including four input terminals one of which is the corresponding line from said logic module, and means connecting with the remaining three inputs of the AND-circuits of each plane the output lines that correspond with the different binary states of the corresponding state register, respectively.

11. Apparatus as defined in claim 2, wherein said computer system is of the triple modular redundancy type, said system including three each of said input and output busses, said reconfiguration network means, and said state register means;

and further wherein the total number of said logic modules is four, only three of said logic modules being active at a given time.

* * * * *